United States Patent Office.

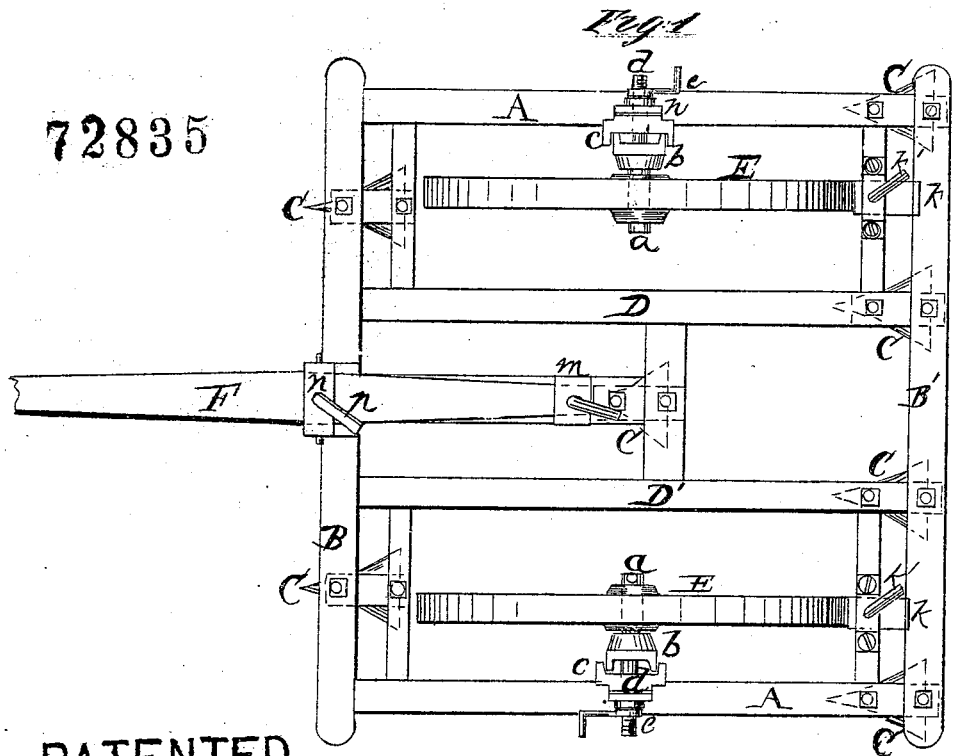
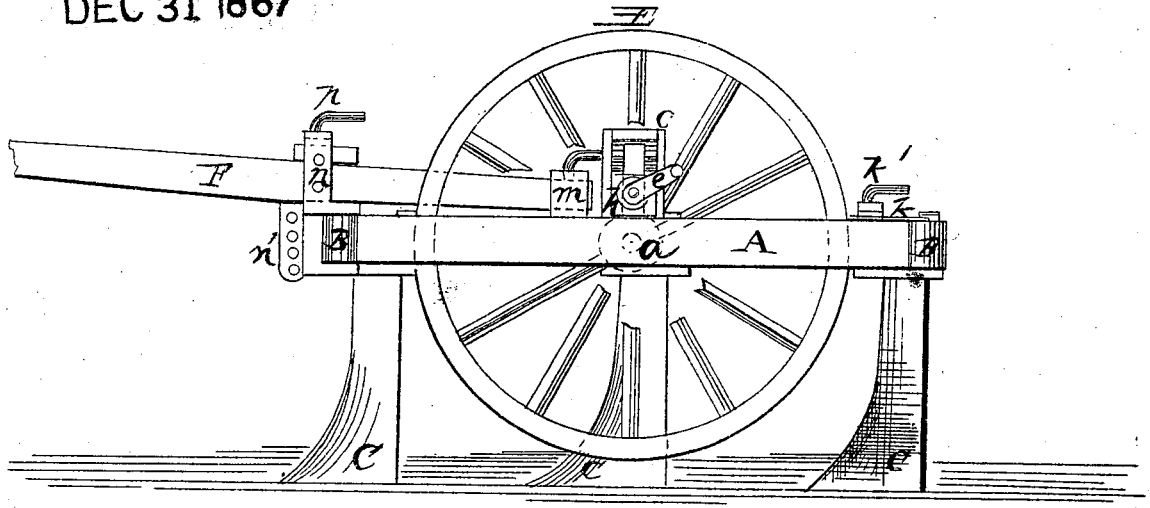
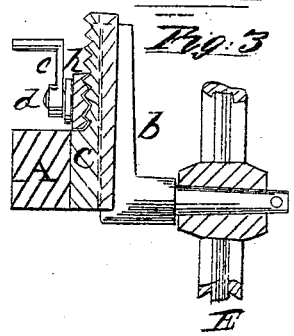

R. GARTER, OF GRAND RAPIDS, MICHIGAN.

Letters Patent No. 72,835, dated December 31, 1867.

CULTIVATORS.

The Schedule referred to in these Letters Patent and making part of the same.

TO ALL WHOM IT MAY CONCERN:

Be it known that I, R. GARTER, of Grand Rapids, in the county of Kent, and State of Michigan, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a top view of my improved cultivator.

Figure 2, a side elevation.

Figure 3, a detached vertical section of the device for raising and lowering the frame on the wheels.

Similar letters of reference indicate like parts.

This invention relates to improvements in the construction of cultivators, mounted on wheels, and adapted to the working of corn, cotton, and other crops, and general field-work, and consists in forming a truck-frame with the wheels inside of the side beams, and so connected that the frame may be raised and lowered readily, for giving more or less depth to the teeth or ploughs. Other devices and arrangements are attached to my improved cultivator, which secure important advantages in its use and management, as hereinafter described.

A A are the side beams of a rectangular truck-frame. B are the front and B' the rear cross-beams, with two inside beams, D D', running from the front to the rear cross-beams, and the frame is made of any desired size. The driving-wheels E E are placed inside of the side beams A A, and are hung on axles $a$ $a$ that are attached to cast-iron arms or slides $b$ $b$ that are fitted in grooved cast-iron uprights $c$ $c$, which are made fast on the beams A A. The slides $b$ $b$ are secured at any desired point in the uprights $c$ $c$ by screw-bolts $d$ $d$ cast into the slides; on which bolts are fitted crank-nuts $e$ $e$, that force serrated washers $h$ $h$ against the serrated face of the uprights $c$ $c$, as shown clearly in enlarged detail, fig. 3. By means of these devices the truck-frame can be raised or lowered readily to set the ploughs C C attached thereto at any required depth. The ploughs C C are made pointed, with wings or mould-boards on each side, and two of them are placed directly in front of the wheels, that they may follow in the outside of the furrow they make in graded tracks for the wheels to run evenly and keep the ploughs steady. At the rear of the wheels are fastened sliding wipers or scrapers $k$ $k$, that are held and adjusted to the periphery of the wheels, for the purpose of cleaning off the clay or tenacious earth that may stick to them, by set-screws $k'$. F is the draught-pole, fastened to the truck-frame, at its rear end, by a cast-iron loop or socket, $m$, and passes through a cast-iron loop, $n$, forming part of a clevis, $n'$, that is bolted to the front cross-beam B, and has holes in it in a vertical row for hitching higher or lower. The loop $n'$ is made large enough to allow the tongue F to be shifted in its position higher or lower by blocking above or below, and it is kept in place by a set-screw, $p$. The wheels, being placed inside of the frame, are out of the way of all obstacles, and, as the outside ploughs are on the sides of the frame beyond the wheels, the cultivator can be worked close up to stumps, fences, trees, and other obstacles in the field, or to crops in rows.

What I claim as new, and desire to secure by Letters Patent, is—

1. The arrangement of the wheels E E, hung on the inside of the frame-beams A A, with an adjustable cast-iron slide, $b$, working in uprights $c$ $c$, having serrated or toothed faces for fastening it at any height, with corresponding serrated washers $h$ $h$ on the bolts $d$, by the crank-nuts $e$, substantially as and for the purposes herein described.

2. The sliding adjustable wipers $k$, in combination with the wheels E E, constructed and operating as and for the purposes herein described.

3. The cast-iron loop $n$ and clevis $n'$, combined with the draught-pole F, constructed and applied substantially as set forth.

R. GARTER.

Witnesses:
M. REMINGTON,
A. L. DRESSER.